H. T. Watkins,
Cider Mill.
Nº 31,344. Patented Feb. 5, 1861.
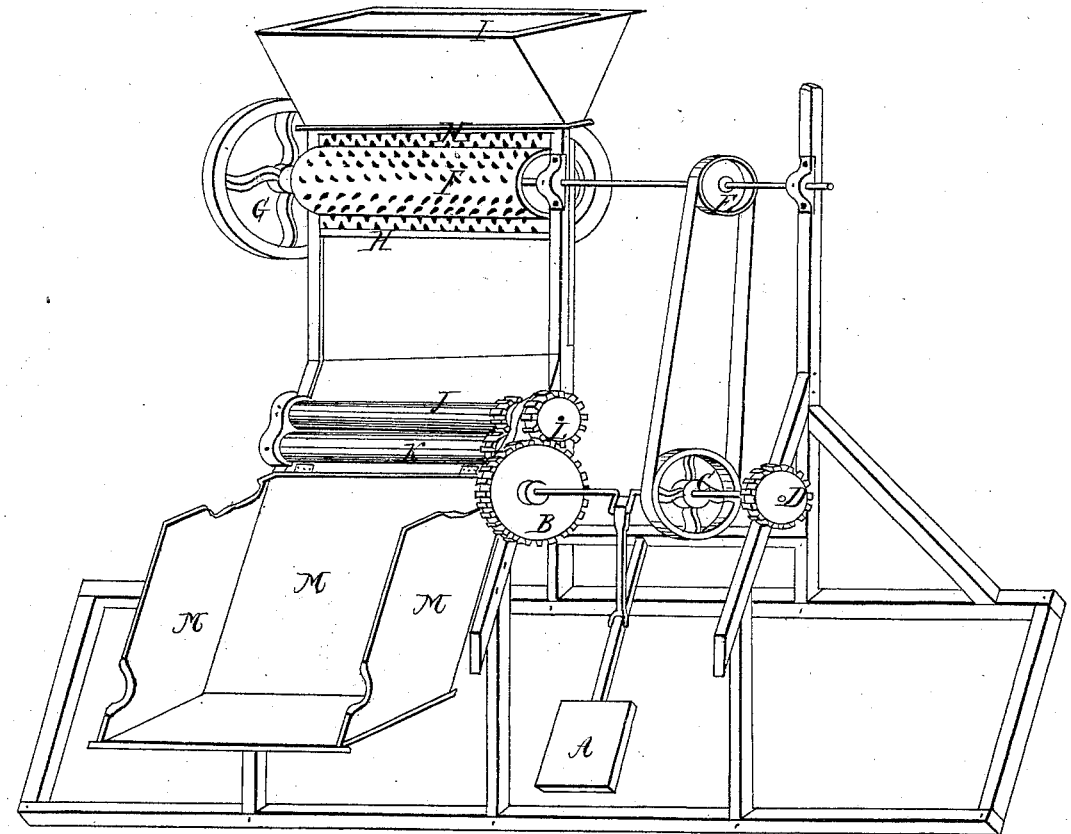
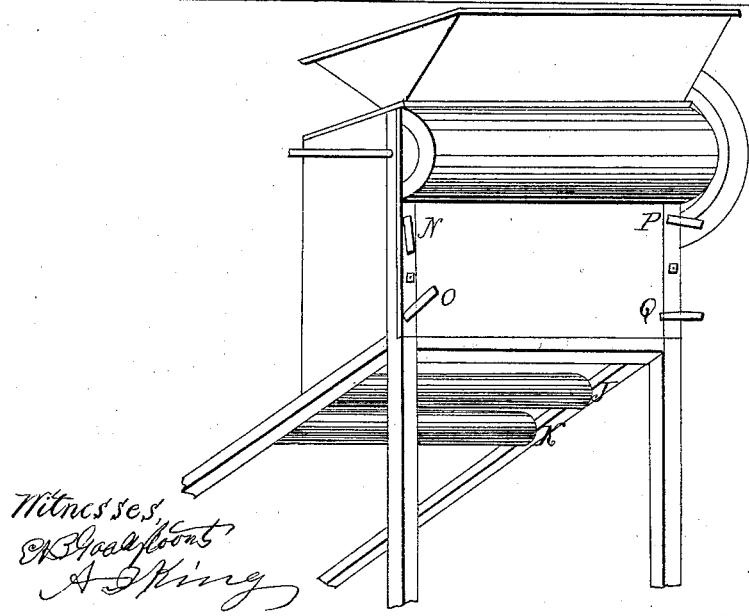

UNITED STATES PATENT OFFICE.

HENRY T. WATKINS, OF ANDERSON, INDIANA.

CIDER-MILL.

Specification of Letters Patent No. 31,344, dated February 5, 1861.

*To all whom it may concern:*

Be it known that I, HENRY T. WATKINS, of the town of Anderson and county of Madison and State of Indiana, have invented a new and Improved Machine for Grinding and Mashing Apples for the Purpose of Making Cider; and I do hereby declare that the following is a full and exact description thereof, reference being had to the accompanying drawings, and to the letters of reference marked thereon.

The nature of my invention consists in constructing a frame with cross timbers to lay my different shafting upon.

My first principle of operation by a reference to the accompanying drawings is shown at letter A, which is a tramp lever hung to a crank made on shaft, upon which shaft are hung three wheels, two cog or spur wheels, one a drum wheel, as shown in drawing, letters B, C, and D. Said wheels are driven if desirable by the operator by tramp lever A, or if desirable by the operator. There is a one horse power or any other power to suit the operator attached to the wheel on the out end of said shaft at letter D, which power puts the machine in motion. The drum wheel, C, has a band over it drawing over pulley, letter E, which pulley is hung on the cylinder shaft. The said cylinder, letter F, is driven by band passing around pulley, letter E, which will give the cylinder about six or seven hundred revolutions per minute. Said cylinder shaft has also a balance wheel on end of shaft, said balance wheel shown by letter G, said cylinder running in a concave (shown by letter H,) hopper, I, above to receive the apples, and conduct them into the mill. The apples pass through between the concave and cylinder which operation cuts them into very small bits, and then they fall onto two reverse rollers passing between them, which operation mashes them to pumice, said reverse rollers shown by letters J, and K, which rollers are driven by wheel, letter B, which wheel gears with wheel, letter L, on end of journal of one of said rollers. Said rollers are geared together by two pinion wheels giving them a reverse motion. The said rollers and cylinder are all inclosed by a door hung on hinges at bottom of door and fastened at top with hooks and staples to be opened or shut at pleasure, said door shown by letter M.

In order to give you a more full description of my mill I will give another view of it as follows: On the back of the concave are four thumb screws that may be drawn at pleasure so as to regulate the cutting of the apples finer or coarser at pleasure. The above named thumb screws are shown on back of machine by letters N, O, P, Q, just above the mouth or place of discharge as shown by letter R. I give you two forms of drawings of my machine a front and also a back view and Figures 1, 2, and 3 are sectional views of the reverse rollers and cylinder.

I do not claim as new the several parts of this machine but

What I claim is—

The combination and arrangement of the several parts when constructed and arranged substantially as herein represented for the purpose set forth.

In witness whereof I hereunto set my hand on this 25 day of April 1860.

HENRY T. WATKINS.

Attest:
T. C. S. COOPER,
ASA H. PRATT.